July 19, 1960  H. LIEBERT  2,945,280
CHAIN WITH CLIPS AND PIN BARS FOR TENTERING AND DRYING MACHINES
Filed May 25, 1956  2 Sheets-Sheet 1

INVENTOR
HORST LIEBERT
By Young, Emery & Thompson
ATTYS.

July 19, 1960    H. LIEBERT    2,945,280
CHAIN WITH CLIPS AND PIN BARS FOR TENTERING AND DRYING MACHINES
Filed May 25, 1956    2 Sheets-Sheet 2
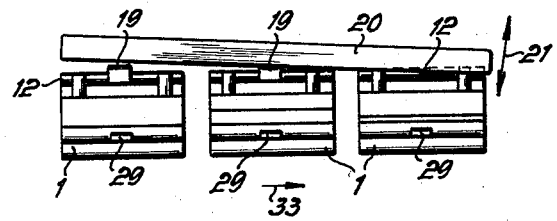
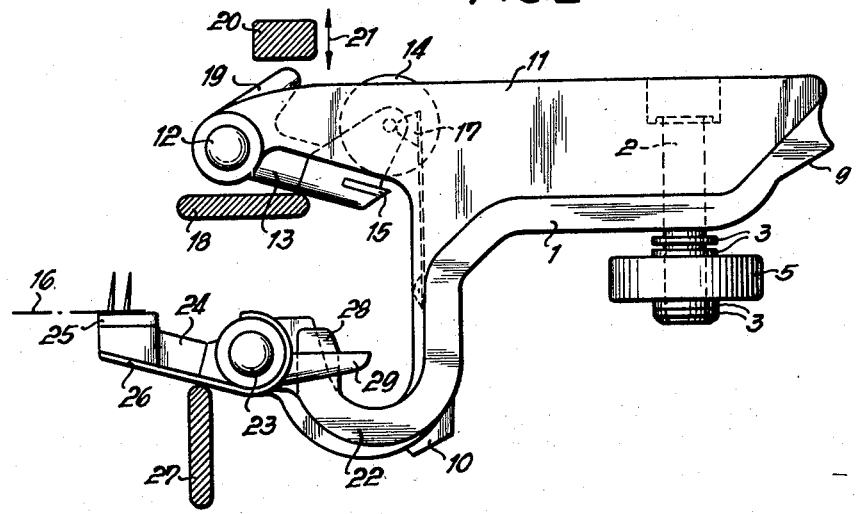
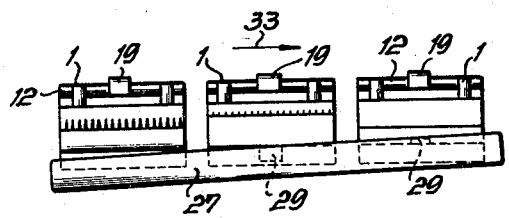
INVENTOR
HORST LIEBERT
BY Young, Emery & Thompson
ATTYS.

United States Patent Office 2,945,280
Patented July 19, 1960

2,945,280

CHAIN WITH CLIPS AND PIN BARS FOR TENTERING AND DRYING MACHINES

Horst Liebert, Grossbottwar, Germany, assignor to Trockentechnik Kurt Brüchner K.G., Stuttgart-Leonberg, Germany Filed May 25, 1956, Ser. No. 587,404

Claims priority, application Germany May 26, 1955

5 Claims. (Cl. 26—62)

The present invention relates to improvements in chains for tentering and drying machines wherein such chains are provided with clips including a clip table and a clip lever for clamping the selvedges of a fabric, and with pin bars for attaching the selvedges thereon, and wherein said clips and pin bars may be used selectively.

It is an object of the present invention to provide a chain of the type as described which is of relatively simple and inexpensive design and may be changed over instantly to either manner of holding the fabric.

More particularly it is an object of the invention to provide a chain with members, each of which supports both a clip table and a pin bar, and wherein each supporting member forms a rocker plate which is pivotable about an angle of approximately 180° from one to another of two end positions, and wherein each clip table and pin bar is disposed at opposite sides of the rocker plate.

A feature of the invention for carrying out the above objects consists in the particular manner of mounting the clip lever on a shaft above the clip table, wherein the clip lever forms a feeler arm, the length of which exceeds the distance between the clip table and the axis of the feeler arm, so that the free end of the feeler arm is capable of engaging the clip table by its own weight within a line spaced in the direction opposite to the fabric from a plane passing through the pivotal axis of the rocker plate vertically to the clip table.

A further object of the invention is to provide a member which supports both a clip table and a pin bar which securely remains in one or the other operative position without requiring any additional locking means.

A particular advantage obtained according to the invention consists in the fact that, when the pin bar is pivoted to its inoperative position, the pins thereof will be completely covered so as to prevent physical injury to the operator as well as any damage to the needles themselves.

Another advantage of the invention is that, when the clip table is in the operative position, the fabric held thereby is not obstructed by any means which might interfere with the air circulation thereon.

Further objects, features, and advantages of the present invention will appear from the following detailed description thereof which is to be read with reference to the accompanying drawings, in which Fig. 1 shows a side view of a chain link according to the invention in the position in which it serves as a clip;

Fig. 2 shows a side view of the same chain link with the pin bar being in the operative position;

Figs. 4 to 6 show front views of three chain links, each illustrating the function of control bars.

Figure 3:
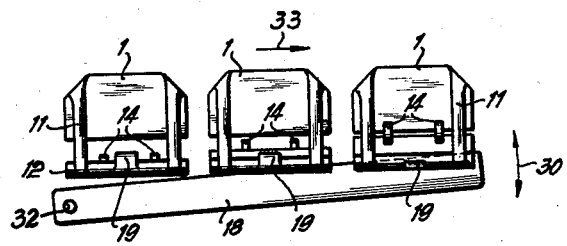
Fig. 3 shows a plan view of three chain links with one control bar.

A plurality of link chain bodies 1 are disposed one behind the other on a roller chain 3, said bodies being mounted on extensions of link bolts 2 of the roller chain 3. The roller chain is guided in a chain rail 4, and with its rollers 5 bears against the flank 6 of the chain rail. Two inclined slideways 7, 8 are provided on the chain rail with which the portions 9 and 10 of the chain link body 1 are in sliding engagement. The chain rail 4 and the slideways 7 and 8 thereof extend in a longitudinal direction at right angles to the plane of the drawing.

At the side opposite to the chain rail the upper end of the link chain body has a projecting part 11 which carries a feeler arm 13 which is pivotable about a shaft 12. Two feeler rollers 14 are mounted on the feeler arm, which also carries a pressure blade 15 which seizes the selvedge of a fabric web 16 when the feeler arm occupies the position shown in Fig. 1, from which it may be pivoted back into an inoperative position (Fig. 2).

Figure 1:
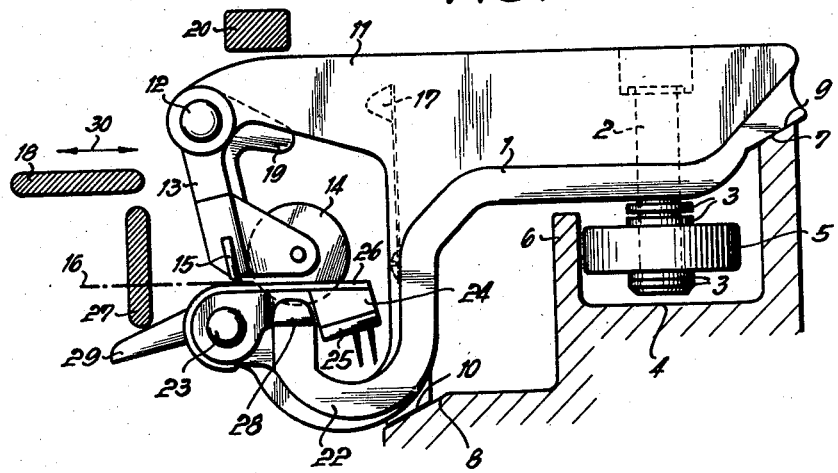

A spring 17 temporarily holds the feeler arm in its inoperative position. When the chain link body by which the feeler arm is supported is moved along a control bar 18, the arm is moved into this inoperative position provided that the control bar is in its operative position. This control bar may be moved manually into the operative position (Fig. 2) or the inoperative position (Fig. 1). A nose 19 is provided on the feeler arm 13 and cooperates with a second control bar 20.

This control bar 20 may be placed into an operative or inoperative position in the direction indicated by the double arrow 21 (Fig. 2).

The lower portion of the link chain body at the side opposite to the chain rail 4 forms one or more arms 22 on which a rocker plate 24 is pivotable about a shaft 23 parallel to the shaft 12. The rocker plate 24 has at one side a fabric supporting surface 26, hereafter called the clip table, and at the rear side thereof a pinbar 25. The rocker plate 24 may be pivoted from one to another of two end positions, as shown in Figs. 1 and 2, respectively, by means of a control bar 27.

These end positions are limited by a double-acting abutment 28 which is mounted on or forms a part of the chain link body 1 and against which in one end position (Fig. 1) the rocker plate 24 bears from above whereas in the other end position (Fig. 2) a nose 29 forming a rearward extension of the rocker plate bears against the abutment 28 from the lower side.

The clip table 26 is provided with recesses for accommodating the feeler rollers 14.

In the position shown in Fig. 1 the rocker plate 24 occupies the end position in which the clip table 26 is turned toward the feeler arm 13. Under the influence of its weight the feeler arm rests with its blade 15 on the clip table. The feeler rollers 14 project into the mentioned recesses provided in the clip table 26. The length of the feeler arm 13 is dimensioned so that a clamping effect is produced between the blade 15 and the clip table 26 by the traction produced by the web 16.

Shaft 23 is arranged so that the line of contact between the clip table and the feeler arm is spaced from the plane drawn through the pivotal axis of the rocker plate vertically to the plane of the fabric in the direction toward the chain 3. The clamping pressure which is exerted by the feeler arm 13 upon the clip table 26 forces the latter upon the abutment 28, thus retaining it in position.

In the position shown in Fig. 2 the rocker arm 24 occupies the position opposite to the one shown in Fig. 1, so that the pins of pin bar 25 will then be directed upwardly. The nose 29 is so arranged that it bears against the abutment 28 when the pin bar in the position according to Fig. 2 is on the same level as the clip table 26 in the position as shown in Fig. 1. The fabric may be attached to the pins in a known manner.

The control bars 18, 20, and 27 operate as follows:

The control bar 18 (Fig. 3) is pivotally mounted about the axis 32 on the machine frame in the direction indicated by the double arrow 30. When bar 18 occupies the position illustrated in Fig. 3, the chain links 1 slide along the bar in the direction indicated by arrow 33, so that the feeler arm 13 is gradually lifted from the position of Fig. 1 to the position of Fig. 2.

Starting from Fig. 2, the rocker plate 24 may then be brought into the position shown in Fig. 1 by means of the control bar 27, as is shown diagrammatically in Fig. 4, the upper edge of the control bar engages with the clip table 26 (Fig. 2), and since it is inclined, as shown in Fig. 4 the rocker plate 24 is gradually lifted out of the position of Fig. 2 during the passage of the chain links 1 in the direction of arrow 33 until after passing the upper dead center, it drops of its own accord into the position of Fig. 1.

Figure 5:
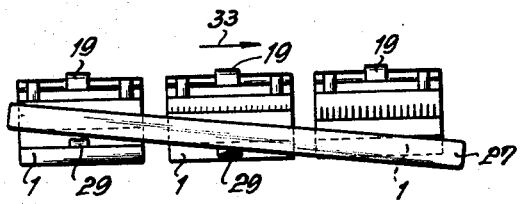

In order to put the rocker plate 24 from the position shown in Fig. 1 into the position of Fig. 2, the control bar 27 may be placed in any suitable manner into the position shown in Fig. 5. The bottom edge of control bar 27 then engages the nose 29 of the rocker plate 24. During the passage of the chain links along the rail in the direction indicated by arrow 33, the nose 29 is gradually lowered until after passing the upper dead center, the rocker plate 24 drops of its own accord into the position of Fig. 2.

Fig. 6 shows diagrammatically how the feeler 13 is urged out of engagement behind the spring (Fig. 2) by means of the inclined control bar 20 engaging at the nose 19 of the feeler 13, until by its own weight it drops into the position shown in Fig. 1.

What I claim is:

1. A chain for tentering and drying machines, comprising clips and associated pin bars, each of said clips comprising a clip table and a clip lever, each clip table and associated pin bar being mounted on a single pivotable supporting member, said supporting member forming a rocker plate which is pivotable through an angle of approximately 180° from one to another of two end positions, said clip table and pin bar being disposed at opposite sides of said rocker plate, said rocker plate and clip lever being mounted on a single body and at one side thereof, each clip lever forming a feeler arm mounted above the clip table, the length of said feeler arm exceeding the distance between the clip table and the horizontal axis of said feeler arm, so that the free end of said feeler arm is adapted to engage said clip table by its own weight within a line spaced in the direction toward said body from a plane passing through the pivotal axis of said rocker plate vertically to said clip table, and locking means adapted to maintain the feeler arm in an inoperative position so as to permit said rocker plate to be pivoted from one end position to the other.

2. A chain for tentering and drying machines, comprising clips and associated pin bars, each of said clips comprising a clip table and a clip lever, each clip table and associated pin bar being mounted on a single pivotable supporting member, said supporting member forming a rocker plate which is pivotable through an angle of approximately 180° from one to another of two end positions, said clip table and pin bar being disposed at opposite sides of said rocker plate, and at least one abutment, said rocker plate when in one end position engaging by its own weight with the upper side of said abutment and when in the other position with the lower side of said abutment.

3. A chain for tentering and drying machines, comprising clips and associated pin bars, each of said clips comprising a clip table and a clip lever, each clip table and associated pin bar being mounted on a single pivotable supporting member, wherein said supporting member be forms a rocker plate which is pivotable through an angle of approximately 180° from one to another of two end positions, said clip table and pin bar being disposed at opposite sides of said rocker plate, said rocker plate and clip lever being mounted on a single body and at one side thereof, each clip lever forming a feeler arm mounted above the clip table, the length of said feeler arm exceeding the distance between the clip table and the horizontal axis of said feeler arm, so that the free end of said feeler arm is adapted to engage said clip table by its own weight within a line spaced in the direction toward said body from a plane passing through the pivotal axis of said rocker plate vertically to said clip table.

4. A chain for tentering and drying machines, comprising clips and associated pin bars, each of said clips comprising a clip table and a clip lever, each clip table and associated pin bar being mounted on a single pivotable supporting member, wherein said supporting member forms a rocker plate which is pivotable through an angle of approximately 180° from one to another of two end positions, said clip table and pin bar being disposed at opposite sides of said rocker plate, a shaft extending parallel to the direction of motion of a fabric to be treated, and the pivotable supporting member for the clip table and the pin bar being pivotally supported around the shaft.

5. In a chain link for chains of fabric tentering and drying machines having a clip comprising a clip table and a clip lever, a pin support, the clip table and the pin support being mounted on a common supporting member which is pivotable on the chain link about an axis extending parallel to the direction of travel of the link, a pair of stops spaced from each other by more than 90°, the supporting member being pivotable into two operating positions determined by the stops, and said member carrying the clip table on a first surface disposed on a portion located on the same side of the pivotal axis as the clip lever, and the pins on a second surface opposite to the first surface on the other side of said portion.

References Cited in the file of this patent

FOREIGN PATENTS

| | | |
|---|---|---|
| 104,467 | Germany | Aug. 5, 1899 |
| 929,723 | Germany | July 4, 1955 |
| 1,004,530 | France | Nov. 28, 1951 |